(12) United States Patent
Macfarlane et al.

(10) Patent No.: US 9,409,474 B2
(45) Date of Patent: Aug. 9, 2016

(54) METHOD AND SYSTEM FOR ADJUSTING GRILLE SHUTTERS BASED ON TEMPERATURE AND POSITION FEEDBACK

(71) Applicant: Ford Global Technologies, LLC, Dearborn, MI (US)

(72) Inventors: Kevin Macfarlane, Northville, MI (US); Christopher Semanson, Dearborn, MI (US); Robert Roy Jentz, Westland, MI (US); Joseph James Gallo, Fraser, MI (US); Chuck Irwin Rackmil, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 14/092,495

(22) Filed: Nov. 27, 2013

(65) Prior Publication Data

US 2015/0149043 A1    May 28, 2015

(51) Int. Cl.

| | |
|---|---|
| B60R 22/00 | (2006.01) |
| E05F 15/00 | (2015.01) |
| G05D 1/00 | (2006.01) |
| G05D 3/00 | (2006.01) |
| G06F 7/00 | (2006.01) |
| G06F 17/00 | (2006.01) |
| B60K 11/08 | (2006.01) |
| F01P 7/12 | (2006.01) |
| G06F 11/30 | (2006.01) |
| G06F 19/00 | (2011.01) |
| G07C 5/00 | (2006.01) |

(Continued)

(52) U.S. Cl.
CPC ............... B60K 11/085 (2013.01); F01P 7/12 (2013.01); B60K 11/04 (2013.01); B60K 11/08 (2013.01); G06F 7/00 (2013.01); G06F 17/00 (2013.01)

(58) Field of Classification Search
CPC ............ G06F 17/00; G06F 7/00; B60K 11/04; B60K 11/08
USPC .................................. 701/49, 29.2; 180/68.1
See application file for complete search history.

(56) References Cited

U.S. PATENT DOCUMENTS

| | | | |
|---|---|---|---|
| 8,311,708 | B2 | 11/2012 | Kerns |
| 8,505,660 | B2 | 8/2013 | Fenchak et al. |
| 2011/0118945 | A1 | 5/2011 | Mochizukil |

(Continued)

OTHER PUBLICATIONS

Macfarlane, Kevin et al., "Method for Adjusting Vehicle Grille Shutters Based on Vehicle Speed and Direction of Grille Shutter Adjustment," U.S. Appl. No. 14/092,546, filed Nov. 27, 2013, 45 pages.
Pursifull, Ross D., "Method and System for Reducing Charge Air Cooler Condensate Using a Secondary Intake Throttle," U.S. Appl. No. 14/084,295, filed Nov. 19, 2013, 38 pages.
Sowards, John et al., "Active Grille Shutter System with a Staged Progressive Linkage to Reduce Engine Misfire From Charge Air Cooler Condensation," U.S. Appl. No. 13/857,365, filed Apr. 5, 2013, 43 pages.

(Continued)

*Primary Examiner* — Helal A Algahaim
*Assistant Examiner* — Mahmoud Ismail
(74) *Attorney, Agent, or Firm* — Julia Voutyras; Alleman Hall McCoy Russell & Tuttle LLP

(57) ABSTRACT

Methods and systems are provided for adjusting vehicle grille shutters based on engine coolant temperature. In one example, a method includes adjusting grille shutters based on engine coolant temperature and additional engine operating conditions when engine coolant temperature is below a threshold and adjusting the grille shutters base on the engine coolant temperature only when the engine coolant temperature is above the threshold. Further, the method may include recalibrating a position of the grille shutters based on a grille shutter position error.

17 Claims, 7 Drawing Sheets

(51) Int. Cl.
*B60K 11/00* (2006.01)
*B60K 11/04* (2006.01)

(56) References Cited

U.S. PATENT DOCUMENTS

| | | | |
|---|---|---|---|
| 2011/0137530 A1* | 6/2011 | Kerns | 701/49 |
| 2011/0247779 A1 | 10/2011 | Charnesky et al. | |
| 2012/0097464 A1* | 4/2012 | Waugh | B60K 11/085 180/68.1 |
| 2013/0103265 A1* | 4/2013 | Remy et al. | 701/49 |
| 2013/0184943 A1* | 7/2013 | Sato et al. | 701/49 |
| 2013/0247862 A1 | 9/2013 | Sakai | |
| 2013/0268164 A1 | 10/2013 | Sugiyama | |
| 2013/0338870 A1* | 12/2013 | Farmer et al. | 701/29.2 |
| 2014/0005897 A1* | 1/2014 | Hayakawa | B60K 11/085 701/49 |

OTHER PUBLICATIONS

Styles, Daniel J. et al., "Engine Cooling Fan to Reduce Charge Air Cooler Corrosion," U.S. Appl. No. 13/656,471, filed Oct. 19, 2012, 44 pages.

Surnilla, Gopichandra et al., "Engine Control Coordination With Grille Shutter Adjustment and Ambient Conditions," U.S. Appl. No. 13/656,542, filed Oct. 19, 2012, 33 pages.

Styles, Daniel J. et al., "Charge Air Cooler (CAC) Corrosion Reduction Utilizing Grille Shutters," U.S. Appl. No. 13/656,524, filed Oct. 19, 2012, 33 pages.

Shigarkanthi, V. et al., "Application of Design of Experiments and Physics Based Approach in the Development of Aero Shutter Control Algorithm," SAE International Paper Series No. 2011-01-0155, SAE International, Apr. 12, 2011, 8 pages.

\* cited by examiner

METHOD AND SYSTEM FOR ADJUSTING GRILLE SHUTTERS BASED ON TEMPERATURE AND POSITION FEEDBACK

BACKGROUND/SUMMARY

A vehicle grille is typically located at a front end of a vehicle, and can be configured to provide an opening through with intake air is received from outside of the vehicle, such as a grille opening or bumper opening. Such intake air may then be directed to an engine compartment of the vehicle to assist the vehicle's cooling system in cooling the engine, transmission, and other such components of the engine compartment. Such air flow via the grille may add aerodynamic drag when the vehicle is in motion. Accordingly, grilles may include grille shutters to block such air flow, thus reducing aerodynamic drag and improving fuel economy. Closed grille shutters may also provide a faster powertrain warm-up which may improve fuel economy since there is less friction, and may improve the performance of the passenger compartment heater. However, closed grille shutters also reduce the air flow through the radiator and other components for cooling purposes. As a result, engine temperatures such as engine coolant temperature (ECT) may increase. Thus, grille shutter operation may include increasing or decreasing the opening of the grille shutters based on engine cooling demands and vehicle driving conditions.

One example approach for adjusting grille shutters is shown by Kerns et al. in U.S. Pat. No. 8,311,708. Therein, vehicle grille shutters are adjusted in response to engine temperature and a non-driven vehicle condition. For example, when engine temperature is above a threshold temperature, the grille shutters may be opened.

However, the inventors herein have recognized potential issues with such systems. As one example, fully opening the grille shutters responsive to a threshold engine temperature may increase the opening of the grille shutters more than necessary, thereby reducing vehicle fuel economy. However, not opening the grille shutters soon enough (at the appropriate threshold) may cause engine temperatures to increase, thereby degrading engine performance. Further, during use the grille shutters may become incorrectly calibrated such that an actual position of the grille shutters may be different than the commanded position. As a result of degraded position control, engine temperatures (e.g., ECT) may increase, thereby resulting in degraded engine operation. For example, if grille shutters are not fully opened when commanded, ECT may increase and reduce engine cooling provided by the radiator.

In one example, the issues described above may be addressed by a method for during a first condition, adjusting grille shutters based on engine coolant temperature (ECT) and additional engine operating conditions and during a second condition when ECT is greater than a threshold temperature, adjusting the grille shutters from a partially open position based on ECT independent of the additional engine operating conditions. In this way, the grille shutters may be maintained at least partially open to aid in engine cooling when the ECT is greater than the threshold temperature. As a result, ECT may be decreased while also reducing the effect on fuel economy.

As one example, an engine controller may determine a commanded position of the grille shutters and then adjust a motor coupled to the grille shutters to move the grille shutters into the commanded position. When ECT is at or below the threshold temperature, the engine controller may adjust the grille shutters based on ECT and additional engine operating conditions, the additional engine operating conditions including one or more of a vehicle driving condition, pedal position, charge air cooler efficiency, charge air cooler temperature, or vehicle speed. Alternatively, when ECT is above the threshold temperature, the engine controller may determine a percentage opening of the grille shutters as a function of only ECT and then adjust the grille shutters to the determined percentage opening. The percentage opening may be between the partially open position and a maximal percentage opening, the percentage opening increasing with increasing ECT. In one example, the partially open position may be a percentage opening of 10% and the maximal percentage opening may be a percentage opening of 100%.

Further, during operation when ECT is above the threshold temperature, the engine controller may verify the position of the grille shutters. For example, after adjusting the grille shutters to the maximal percentage opening, the engine controller may adjust the grille shutters to a secondary percentage opening and then back to the maximal percentage opening, the secondary percentage opening smaller than the maximal percentage opening. The engine controller may then indicate degradation of the grille shutters and set an out of position flag if a stall current is not detected upon adjusting the grille shutters back to the maximal percentage opening from the secondary percentage opening. The stall current may be produced by the grille shutters contacting an end stop upon reaching the maximal percentage opening. When the ECT decreases back below the threshold temperature, the controller may then recalibrate the grille shutters if the out of position flag was set.

Recalibration of the grille shutters may also be initiated by the engine controller when a position error increases above a threshold. For example, the controller may determine the grille shutter position error based on a difference between the commanded position and a feedback position. The feedback position may be based on an output from a grille shutter position sensor. In this way, if grille shutter position control is degraded, recalibration may reset the grille shutter position and increase accuracy of the commanded grille shutter position. As a result, the desired cooling may be provided while also increasing vehicle fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
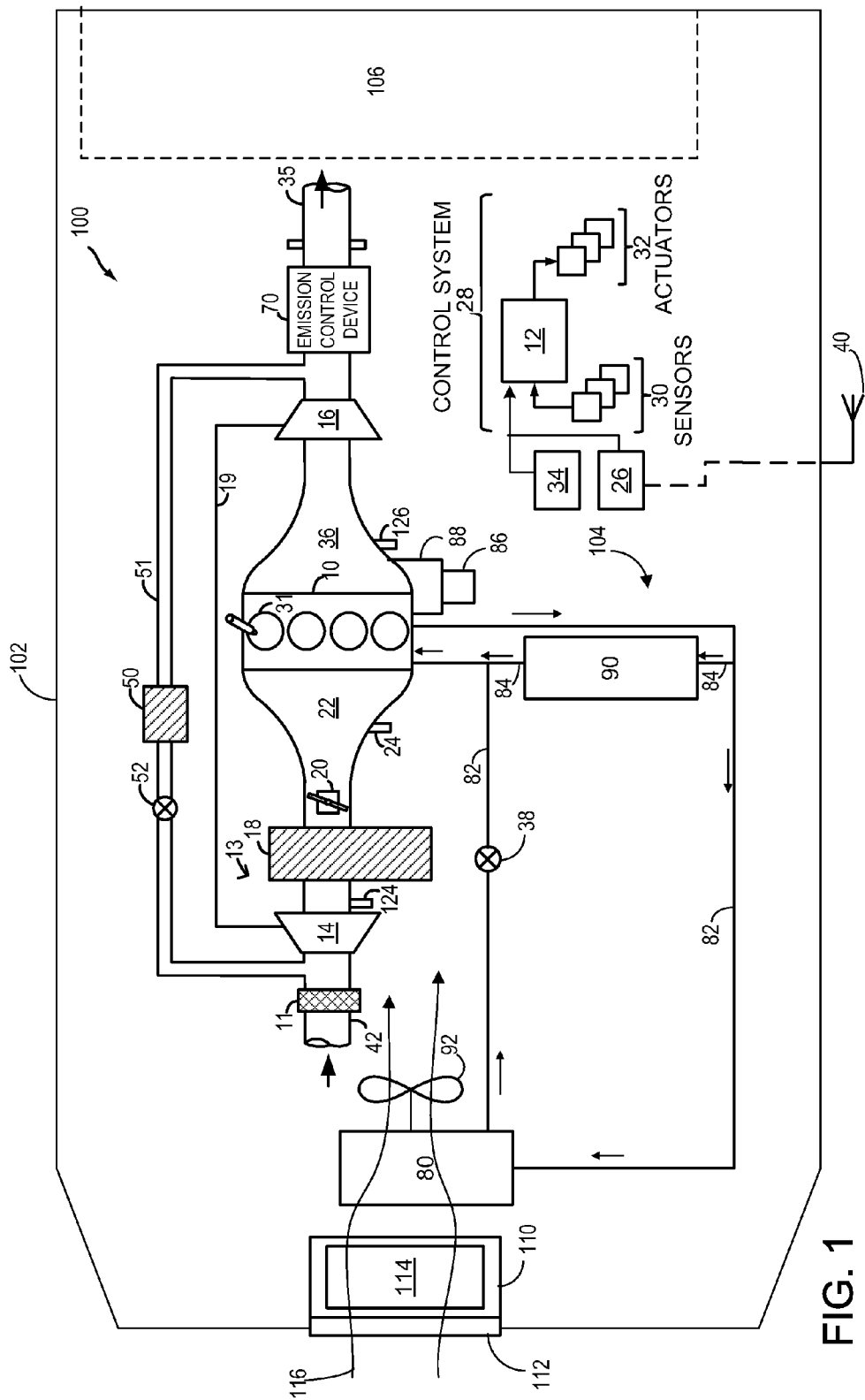
FIG. 1 shows a schematic diagram of a grille shutter system, engine, and associated components in a vehicle.
Figure 2:
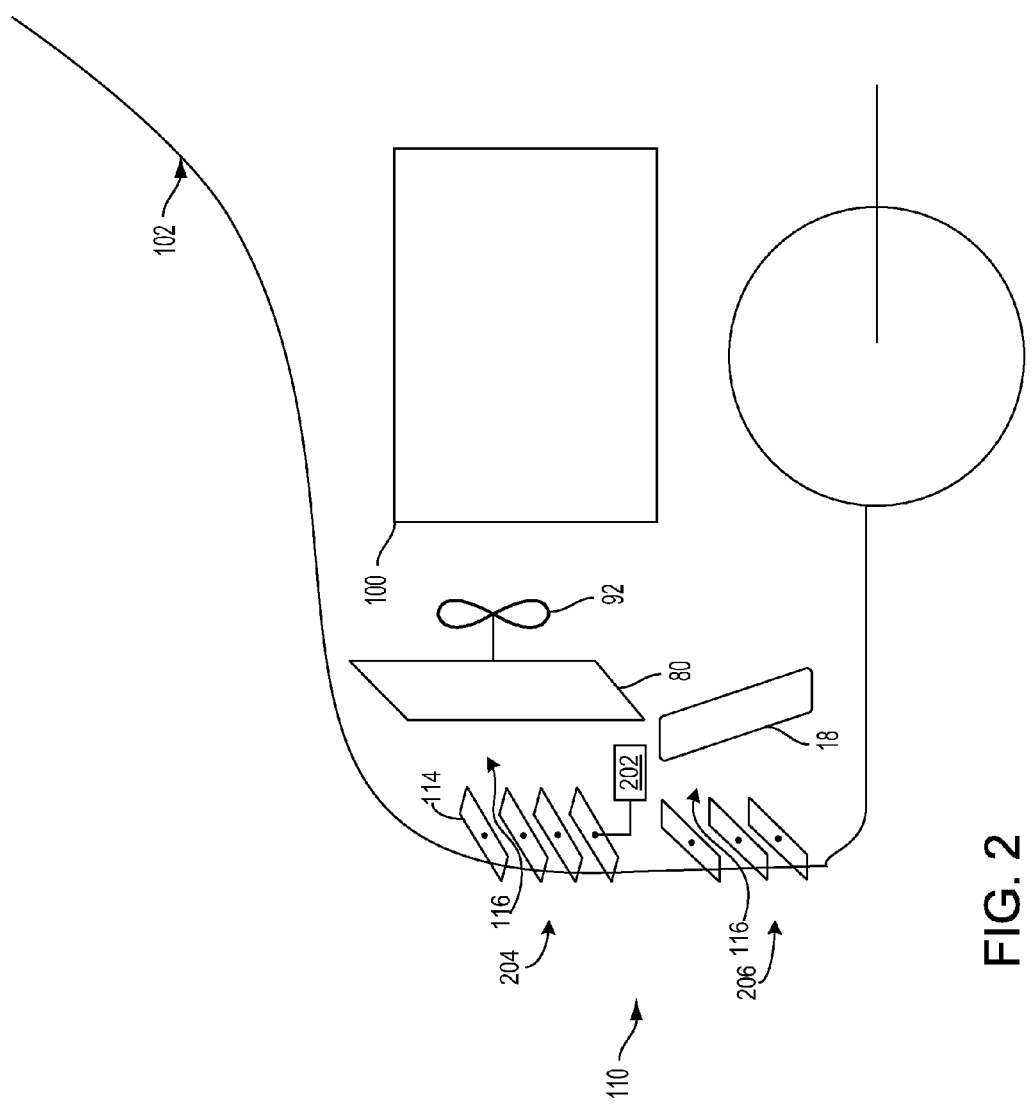
FIG. 2 shows an example of a CAC, radiator, and engine location within a vehicle with respect to the grille shutters and associated ambient airflow.
Figure 6:
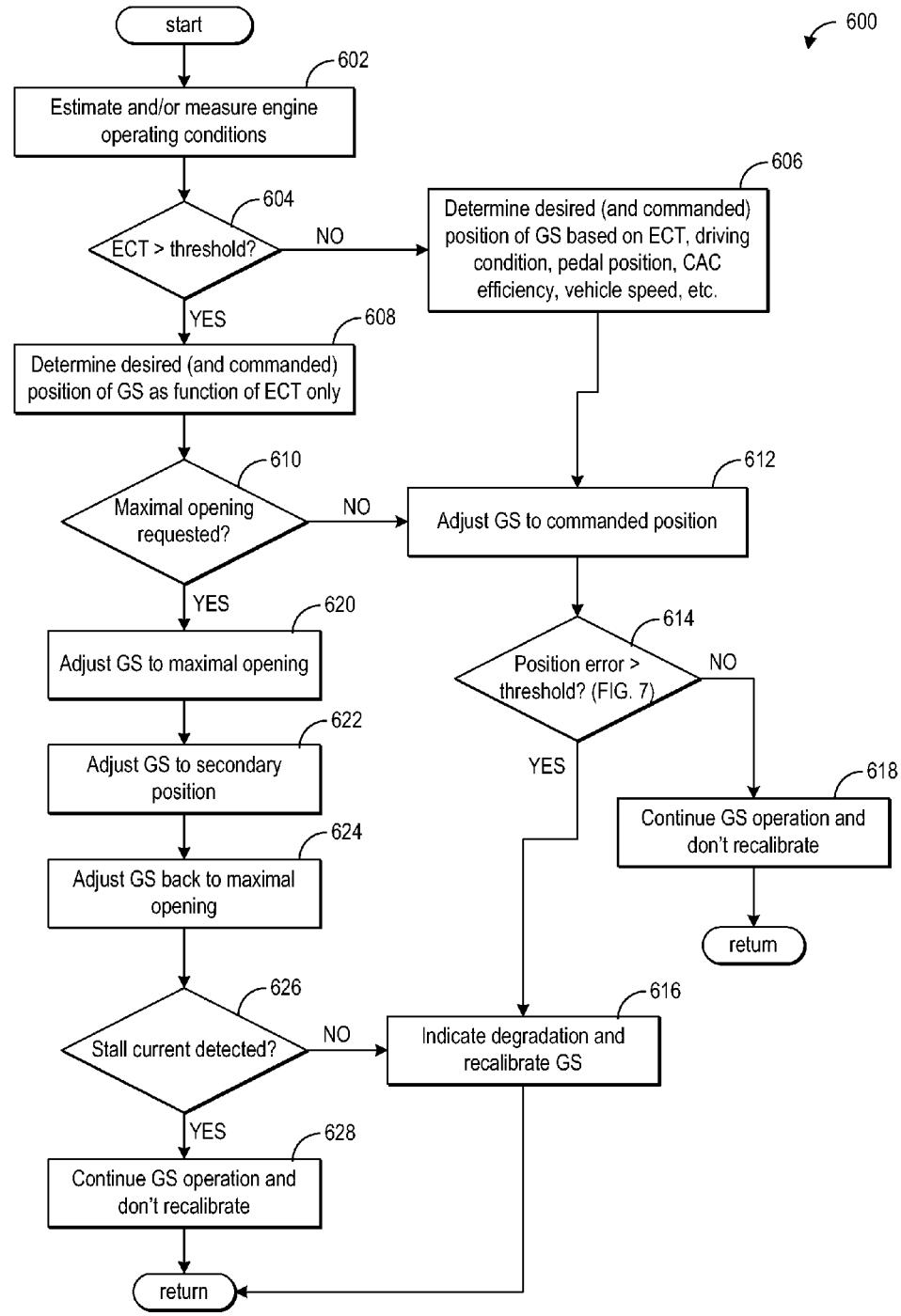
FIG. 6 shows a method for adjusting grille shutters based on engine coolant temperature.
Figure 8:
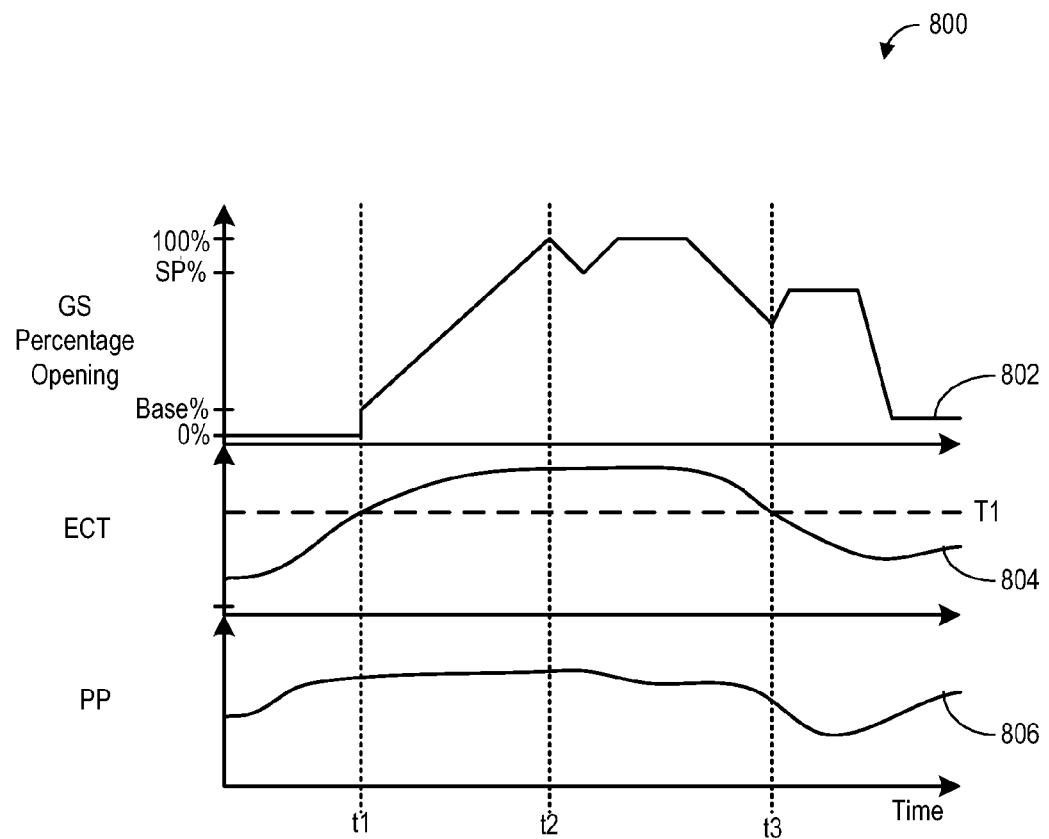
FIG. 8 shows a graphical example of adjusting grille shutters based on engine coolant temperature.

The following description relates to systems and methods for adjusting vehicle grille shutters to adjust cooling to an engine system, such as the engine system shown in FIG. 1. Vehicle grille shutters may be positioned at a grille of a front end of a vehicle, as shown at FIG. 2. A percentage opening of the grille shutters may be adjusted based on engine operating conditions in order to increase or decrease cooling airflow to the engine. Specifically, an engine controller may send a commanded grille shutter position to a motor coupled to the grille shutters, such as the motor shown in FIG. 3. The motor may then adjust the grille shutters into the commanded position. Different grille shutter positions are shown at FIG. 4 with respect to an opening angle of the grille shutters. In one example, as engine coolant temperature increases, additional engine cooling may be needed. Thus, the controller may increase the opening of the grille shutters to increase cooling airflow to the engine. However, additional engine operating conditions may result in a decrease in grille shutter opening in order to increase fuel economy. If the ECT increases above a threshold, increased engine cooling may be necessary to reduce engine degradation, despite the additional engine operating conditions. A method for determining the commanded grille shutter position and adjusting the grille shutters based on ECT relative to a threshold temperature and additional engine operating conditions is shown at FIG. 6. Example grille shutter adjustments based on ECT are shown at FIG. 8.

Figure 5:
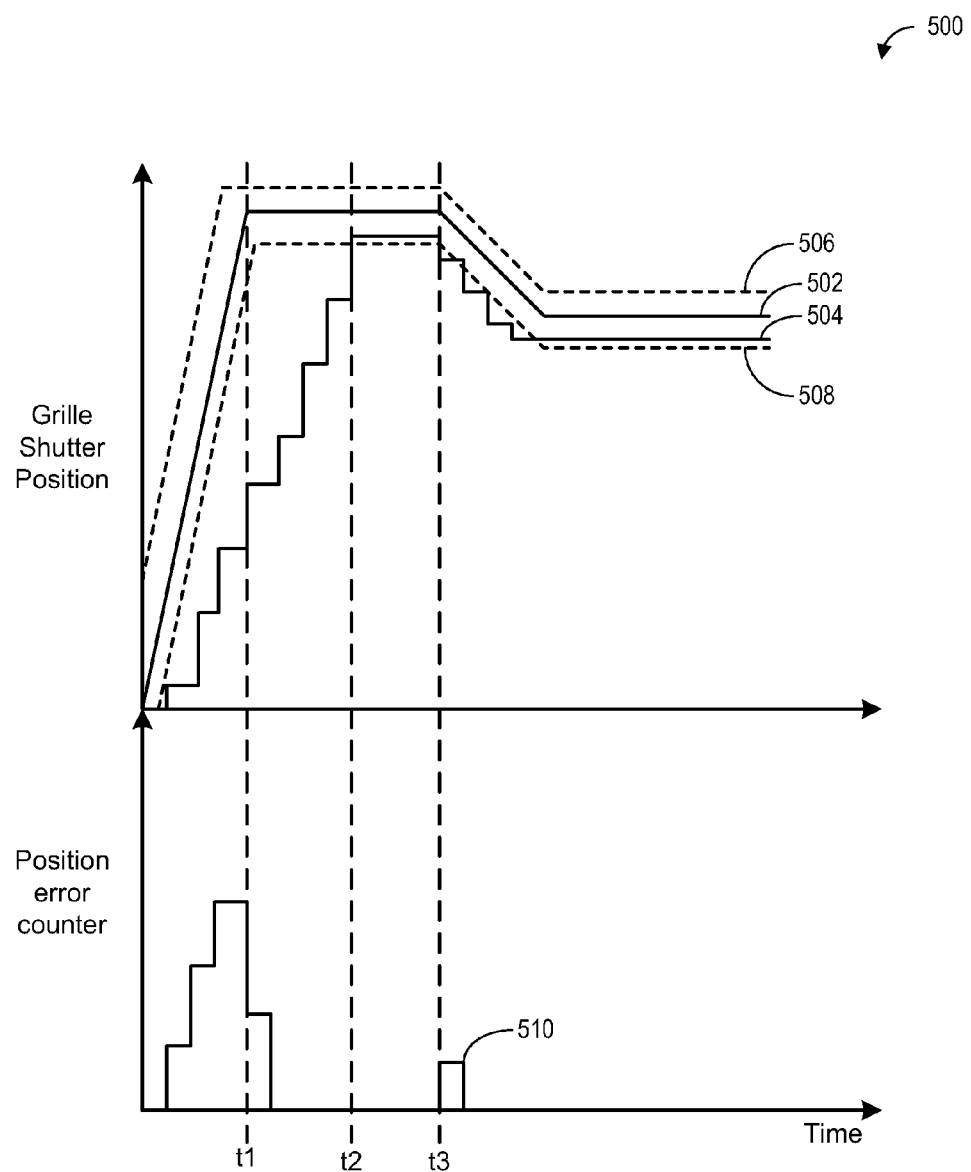
FIG. 5 shows a graphical example of adjusting a position error counter based on a commanded and actual grille shutter position.
Figure 7:
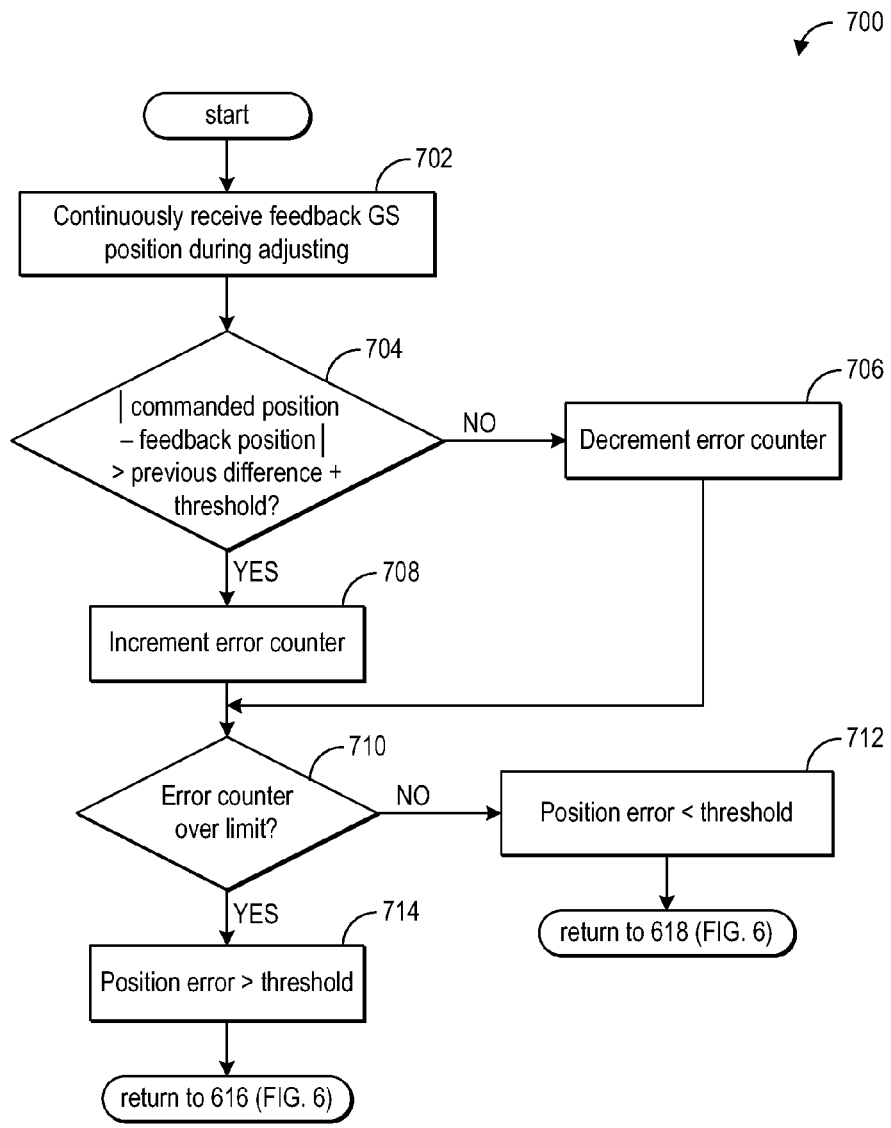
FIG. 7 shows a method for determining a position error of grille shutters.

Further, an actual grille shutter position may differ from the commanded grille shutter position. The difference between these two positions may be referred to as a position error or position error difference. If this error increases, a controller may indicate grille shutter degradation and recalibrate the grille shutters when the engine system is able. A method for determining the grille shutter position error is shown at FIG. 7. Additionally, example adjustments to a position error counter based on the commanded and actual grille shutter positions is shown at FIG. 5.

FIG. 1 shows an example embodiment of a grille shutter system 110 and an engine system 100, in a motor vehicle 102, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the depicted embodiment, engine 10 is a boosted engine coupled to a turbocharger 13 including a compressor 14 driven by a turbine 16. Specifically, fresh air is introduced along intake passage 42 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve 20. The CAC may be an air-to-air or air-to-water heat exchanger, for example. Throttle valve 20 is coupled to engine intake manifold 22. From the compressor, the hot compressed air charge enters the inlet of the CAC 18, cools as it travels through the CAC, and then exits to pass through the throttle valve to the intake manifold. Ambient airflow 116 from outside the vehicle may enter engine 10 through a grille 112 at a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Additionally, condensate may collect at the bottom of the CAC, and then be drawn into the engine at once during acceleration (or tip-in) increasing the chance of engine misfire. In one example, cooling ambient airflow traveling to the CAC may be controlled by the grille shutter system 110 such that condensate formation and engine misfire events are reduced.

In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 31 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and improved performance. In other embodiments, the EGR system may be a high pressure EGR system with EGR passage 51 connecting from upstream of the turbine 16 to downstream of the compressor 14.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant (e.g., engine coolant temperature, ECT) may be regulated by a thermostat valve 38, located in the cooling line 82, which may be kept closed until the coolant reaches a threshold temperature.

Engine system 100 may include an electric fan 92 for directing cooling airflow toward the CAC 18, engine cooling system 104, or other engine system components. In some embodiments, electric fan 92 may be an engine cooling fan. The engine cooling fan may be coupled to radiator 80 in order to maintain airflow through radiator 80 when vehicle 102 is moving slowly or stopped while the engine is running. Fan rotation speed or direction may be controlled by a controller 12. In one example, the engine cooling fan may also direct cooling airflow toward CAC 18. Alternatively, electric fan 92 may be coupled to the engine accessory drive system, driven by the engine crankshaft. In other embodiments, electric fan 92 may act as a dedicated CAC fan. In this embodiment, the electric fan may be coupled to the CAC or placed in a location to direct airflow directly toward the CAC. In yet another embodiment, there may be two or more electric fans. For example, one may be coupled to the radiator (as shown) for engine cooling, while the other may be coupled elsewhere to direct cooling air directly toward the CAC. In this example, the two or more electric fans may be controlled separately (e.g., at different rotation speeds) to provide cooling to their respective components.

Coolant may flow through coolant line 82, as described above, and/or through coolant line 84 to heater core 90 where the heat may be transferred to passenger compartment 106, and the coolant flows back to engine 10. In some examples, engine-driven water pump 86 may operate to circulate the coolant through both coolant lines 82 and 84.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input (e.g., pedal position), brake input, transmission selector position, vehicle speed, engine speed, mass airflow through the engine, boost pressure, ambient temperature, ambient humidity, intake air temperature, fan speed, etc.), cooling system sensors (such as coolant temperature, fan speed, passenger compartment temperature, ambient humidity, etc.), CAC 18 sensors (such as CAC inlet air temperature and pressure, CAC outlet air temperature and pressure, etc.), and others. In addition, controller 12 may receive data from a GPS 34 and/or an in-vehicle communications and entertainment system 26 of vehicle 102.

The in-vehicle communications and entertainment system 26 may communicate with a wireless communication device 40 via various wireless protocols, such as wireless networks, cell tower transmissions, and/or combinations thereof. Data obtained from the in-vehicle communications and entertainment system 26 may include real-time and forecasted weather conditions. Weather conditions, such as temperature, precipitation (e.g., rain, snow, hail, etc.), and humidity, may be obtained through various wireless communication device applications and weather-forecasting websites. Data obtained from the in-vehicle communications and entertainment system may include current and predicted weather conditions for the current location, as well as future locations along a planned travel route. In one embodiment, where the in-vehicle communications and entertainment system includes a GPS, current and future weather data may be correlated with current and future travel routes displayed on the GPS. In an alternate embodiment, wherein the vehicle system includes a dedicated GPS 34, each of the GPS and the in-vehicle communications and entertainment system may communicate with the wireless communication device 40, as well as with each other, to communicate current and future weather data with current and future travel routes. In one example, the entertainment system may access various weather maps stored on the internet or other cloud computing systems. The stored weather maps may include rain, humidity, precipitation and/or temperature information provided as contour maps, for example. In one example, the wireless communication device 40 may relay real-time humidity data to the in-vehicle communications and entertainment system 26, and/or GPS 34, which is then relayed to the controller 12. The controller 12 compares the received humidity data to threshold values and determines the appropriate engine operating parameter adjustments. In one example, these adjustments may include adjusting the grille shutter system 110. For example, if humidity is greater than a defined threshold, one or more of the grille shutters may be closed.

In other embodiments, the presence of rain may be inferred from other signals or sensors (e.g., rain sensors). In one example, rain may be inferred from a vehicle windshield wiper on/off signal. Specially, in one example, when the windshield wipers are on, a signal may be sent to controller 12 to indicate rain. The controller may use this information to predict the likelihood of condensate formation in the CAC and adjust vehicle actuators, such as electric fan 92 and/or grille shutter system 110.

Furthermore, controller 12 may communicate with various actuators 32, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

As noted herein, the amount of waste heat transferred to the coolant from the engine may vary with operating conditions, thereby affecting the amount of heat transferred to the airflows. For example, as engine output torque, or fuel flow, is reduced, the amount of waste heat generated may be proportionally reduced.

Motor vehicle 102 further includes a grille 112 providing an opening (e.g., a grille opening, a bumper opening, etc.) for receiving ambient airflow 116 through or near the front end of the vehicle and into the engine compartment. Such ambient airflow 116 may then be utilized by radiator 80, electric fan 92, and other components to keep the engine and/or transmission cool. Further, the ambient airflow 116 may reject heat from the vehicle air conditioning system and can improve performance of turbo-charged/super-charged engines that are equipped with CAC 18 that reduces the temperature of the air that goes into the intake manifold/engine. In one example, the electric fan 92 may be adjusted to further increase or decrease the airflow to the engine components. In another example, a dedicated CAC fan may be included in the engine system and used to increase or decrease airflow to the CAC.

FIG. 2 shows an example of the CAC 18, radiator 80, electric fan 92, and engine system 100 locations within a vehicle 102 with respect to the grille shutter system 110 and associated ambient airflow 116. Other under hood components (fuel system, batteries, etc.) may benefit from the cooling airflow as well. Thus, grille shutter system 110 may assist cooling system 104 in cooling internal combustion engine 10. In one example, as shown in FIG. 2, grille shutter system 110 may be a dual active grille shutter system comprising two groups of one or more grille shutters 114 configured to adjust the amount of airflow received through grille 112. In another example, the grille shutter system 110 may be an active grille shutter system comprising only one group of one or more grille shutters 114.

Grille shutters 114 may cover a front region of the vehicle spanning from just below the hood to the bottom of the bumper, for example. By covering the vehicle front end, drag is reduced and entry of external cooling air to the radiator 80 and CAC 18 is reduced. In some embodiments, all grille shutters 114 may be moved in coordination by the controller. In other embodiments, grille shutters may be divided into groups and the controller may adjust opening/closing of each region independently. For example, a first group of grille shutters 204 may be positioned in front of the radiator and a second group of grille shutters 206 may be positioned in front of the CAC 18.

As shown in FIG. 2, the first group of grille shutters 204 is positioned vertically above, with respect to a surface on which vehicle 102 sits, the second group of grille shutters 206. As such, the first group of grille shutters 204 may be referred to as the upper grille shutters and the second group of grille shutters 206 may be referred to as the lower grille shutters. An amount of opening of the first group of grille shutters 204 controls an amount of ambient airflow 216 traveling to the radiator 80 and an amount of opening of the second group of grille shutters 206 controls an amount of ambient airflow traveling to the CAC 18. As such, the upper grille shutters may largely affect vehicle drag and engine cooling while the lower grille shutters affect CAC cooling.

In some examples, each group of grille shutters may contain the same number of grille shutters 114, while in other examples one group of grille shutters may contain more than the other. In one embodiment, the first group of grille shutters 204 may contain multiple grille shutters, while the second group of grille shutters 206 contains one grille shutter. In an alternate embodiment, the first group of grille shutters may only contain one grille shutter, while the second group of grille shutters contains multiple grille shutters. In alternate embodiments, all the grille shutters 114 may be included as one group and an amount of opening of the one group of grille shutters 114 may affect vehicle drag, engine cooling, and CAC cooling.

Grille shutters 114 are moveable between an opened position and a closed position, and may be maintained at either position or a plurality of intermediate positions thereof. In other words, opening of grille shutters 114 may be adjusted such that grille shutters 114 are opened partially, closed partially, or cycled between an open position and a closed position to provide airflow for cooling engine compartment components. The open position may be referred to as a maximal amount of opening (or maximal percentage opening) such that the grille shutters are fully open. An amount of opening of the grille shutters 114 or group of grille shutters (e.g., first group of grille shutters 204 or second group of grille shutters 206) may be denoted by a percentage. For example, when the grille shutters are halfway between an opened and closed position, the grille shutters may be 50% open. When the grille shutters are opened to the maximal percentage opening (e.g., an upper threshold amount of opening), the grille shutters may be 100% open.

The grille shutters 114 (e.g., upper grille shutters) may be actuated by a motor 202. Motor 202 may be operatively coupled to the control system 28. As an example, controller 12 may be communicably connected to grille shutter system 110, and may have instructions stored thereon to adjust opening of grille shutters 114. Controller 12 may send signals for adjusting the grille shutter system 110 to motor 202. These signals may include commands to increase or decrease the opening of the upper grille shutters. For example, controller 12 may command the motor 202 to open the upper grille shutters to 30% open. Motor 202 may be coupled to one or more grille shutters 114. For example, motor 202 may be coupled to a first grille shutter 114, the first grille shutter mechanically linked to the remaining grille shutters 114. In another example, motor 202 may be coupled to each grille shutter 114 or each group of grille shutters. Further, in some examples, the grille shutter system 110 may include more than one motor for controller more than one group or more than one individual grille shutter.

Figure 3:
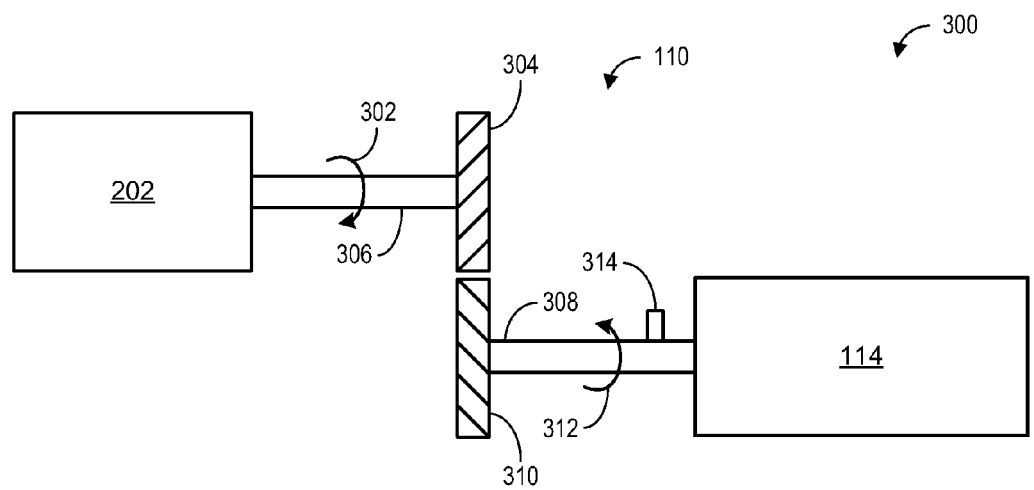
FIG. 3 shows a schematic of a grille shutter system of a vehicle.
Figure 4:
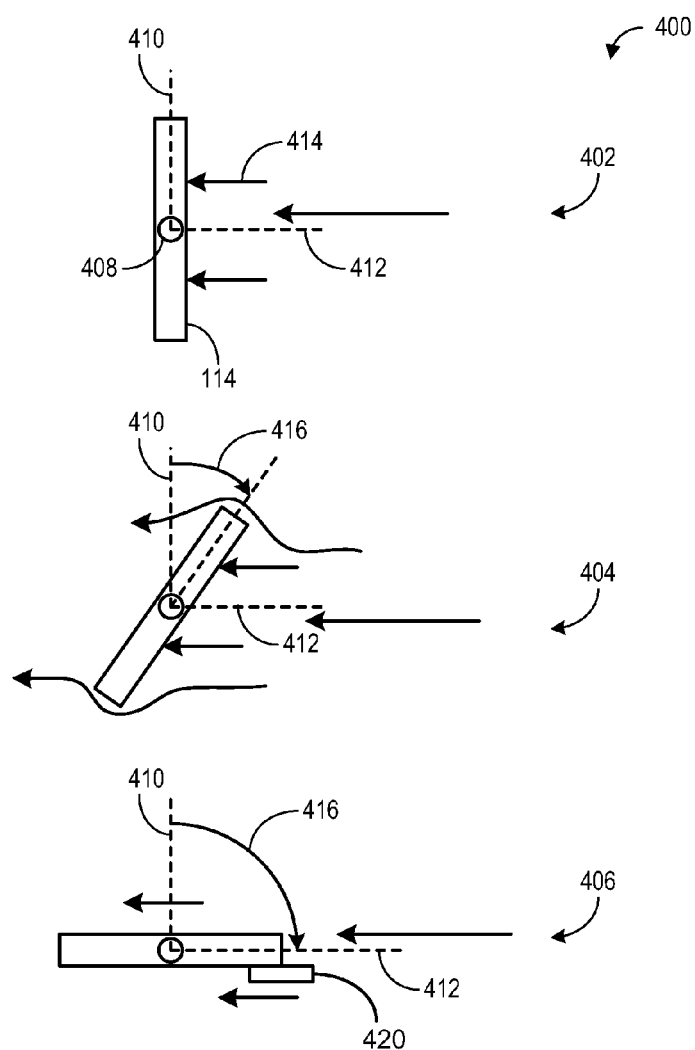
FIG. 4 shows a schematic of different grille shutter vane positions.

FIG. 3 shows a schematic 300 of the grille shutter system 110 including the motor 202 and a single grille shutter 114 of a group of grille shutters. Specifically, schematic 300 shows the motor 202 indirectly coupled to the grille shutter 114 through a series of shafts and gears. The motor 202 is coupled to a first rotatable shaft 302 at a first end of the first shaft 302. A second end of the first shaft 302 is coupled to a first gear 304. As the first shaft 302 rotates in a direction shown by arrow 306, the first gear 304 rotates. As such, the first shaft 302 and the first gear 304 rotate together about a central axis of the first shaft 302. Further, the motor 202 actuates the first shaft 302 to rotate into a plurality of positions.

The individual grille shutter 114 may be referred to as a vane. Schematic 300 shows a front view of the grille shutter vane 114 (with respect to the vehicle front end). As such, airflow from outside of the vehicle may be directed into a plane of the page. The grille shutter vane 114 may be coupled to a second shaft 308 at a first end of the second shaft 308. A second end of the second shaft 308 is coupled to a second gear 310. The first gear 304 interfaces with the second gear 310 such that rotation of the first gear 304 causes rotation of the second gear 310. Specifically, the first gear 304 includes a plurality of teeth offset from a plurality of teeth of the second gear 310. As such, the teeth of the first gear 304 fit between teeth of the second gear 310 and teeth of the second gear 310 fit between teeth of the first gear 304. As shown in the schematic 300, as the first gear 304 rotates in a first direction shown by arrow 306, the second gear consequently rotates in a second direction shown by arrow 312. The second direction is opposite the first direction. As a result of rotating the first shaft 302, the grille shutter vane 114 rotates with the rotation of the second gear 310 and the second shaft 308.

In alternate embodiments, the grille shutters system 110 shown in FIG. 3 may have additional gears and/or shafts coupling the motor 202 to the grille shutter vane 114. Further, additional mechanical components may be included (in addition to those shown in FIG. 3) in the grille shutter system 110 in order to translate movement of the motor 202 into coordinated movement and rotation of the grille shutter vane 114.

In one example, the motor 202 may be a stepper motor. As such, the motor 202 may only move the first shaft 302 into a finite number of positions. Further, the motor 202 may have a minimum amount that it must move with each actuation. For example, the motor 202 may only move in six degree increments. In another example, the motor 202 may move in a different number of degree increments. Further, the motor 202 may have a finite number of motor positions. As a result, a desired grille shutter position may not align with an actual resulting grille shutter position after moving the grille shutters with the motor 202. The motor 202 may instead move the grille shutters to the closest available position to the commanded grille shutter position.

Upon receiving a command from a controller, the motor 202 rotates the first shaft 302 into a position corresponding to the commanded grille shutter position. In one example, the command may be a motor position translated from a commanded grille shutter position. In another example, the command may be the commanded grille shutter position which has a corresponding motor position. The commanded grille shutter position may be a percentage opening (or closing) or an opening angle (e.g., opening degree). For example, 0% open may correspond to a grille shutter angle of 0 degrees, measured from a vertical axis of the grille shutter, as shown at FIG. 4 and explained further below. As discussed above, the commanded grille shutter position may not match up with an exact motor position. Thus, the motor 202 may actuate the grille shutter 114 into the position closest to the commanded position. Though the motor 202 is shown coupled to a single grille shutter 114 in FIG. 4, in some embodiments the motor 202 may be coupled to additional grille shutters. Further, the grille shutter 114 shown in FIG. 4 may be mechanically linked (e.g., via a linkage) to additional grille shutters positioned vertically above and/or below the grille shutter 114. As such, rotating the grille shutter 114 shown in FIG. 4 may rotate the other linked grille shutters by the same amount. In this way, the motor 202 may adjust multiple grille shutters 114 or groups of grille shutters together and in parallel with one another.

A position sensor 314 may be coupled along the grille shutter system 110 to provide feedback of an actual grille shutter vane position to a controller (such as controller 12 shown in FIG. 1). As shown in FIG. 4, the position sensor 314 is positioned along the second shaft 308 closer to the end of the second shaft 308 coupled to the grille shutter vane 114. However, in alternate embodiments, the position sensor 314 may be positioned at a different position on the second shaft 308, first shaft 302, or grille shutter vane 114. The output of the position sensor 314 may be a feedback position of the grille shutters.

In some cases, the feedback position of the grille shutters may be different than the commanded position, thereby resulting in a position error. As discussed above, the actual grille shutter vane position may be different than the commanded grille shutter van position due to the available motor increments not matching exactly with the desired vane angle. Additionally, position error may result from gear lash. As discussed above, the first gear 304 and the second gear 310 have teeth that interface together between teeth of the opposite gear. In some examples, the teeth of the gears may be slightly smaller than the space between adjacent teeth. As a result, when the two gears interface together, there may be an amount of space between the interfacing teeth of the two gears. This space or gap between the interfacing teeth may cause some slip or play in the gears. For example, if interfacing teeth are not positioned against one another when a first of the two gears begins to move, the teeth of the first gear may travel a distance before contacting the interfacing teeth of the second gear and subsequently beginning to move the second gear. Thus, the first gear may rotate a first amount before the second gear begins to rotate. As a result, the grille shutter vane 114 may move the target amount minus the first amount, thereby resulting in a position different than the commanded position.

Gear lash may occur to a greater degree when changing a direction of travel of the grille shutters 114. For example, gear lash may occur when transitioning from opening to closing or from closing to opening the grille shutters. Further details on determining the position error of the grille shutter system 110 are presented below with reference to FIG. 6. In some examples, an allowable position error range, or tolerance band, may be defined such that position errors within the allowable position error range may not result in indicating grille shutter degradation and/or recalibrating the grille shutter system 110.

FIG. 4 shows example grille shutter positions for a single grille shutter vane 114. Specifically, schematic 400 shows a side view of a grille shutter vane 114 (such as the grille shutter vane 114 shown in FIG. 3). The grille shutter vane 114 rotates about a central axis of the vane and the second shaft 308, as shown in FIG. 3. Schematic 400 shows a rotation point 408 of the grille shutter vane 114. The grille shutter vane 114 rotates between a fully open and fully closed position defined by a vertical axis 410 and lateral axis 412 of the grille shutters.

A first grille shutter position is shown at 402. The first grille shutter position is a closed position in which the grille shutters are fully closed, thereby preventing airflow from entering the vehicle through the grille. The percentage opening when the grille shutters are fully closed is 0%. Likewise, the percent closing when the grille shutters are fully closed is 100%. The grille shutter vane 114 is aligned with the vertical axis 410 such that an angle between the grille shutter vane 114 and the vertical axis 114 is approximately 0°. This angle may be referred to as the opening angle. In other embodiments, the fully closed grille shutter position may be slightly larger than 0° (e.g., 5°) to allow for overlapping of adjacent grille shutters. A force 414 acts on an outside face of the grille shutter vane 114, the force 414 resulting from air flow pushing against the vanes as a vehicle (in which the grille shutters are installed) travels in a forward direction. Consequently, the force 414 increases as the speed of the vehicle (vehicle speed, VS) increases.

A second grille shutter position is shown at 404. The second grille shutter position is an intermediate position in which the grille shutter vane 114 is partially open (or partially closed). The opening angle 416 is defined between the vertical axis 410 and a vane axis 418 of the grille shutter vane 114. In one example, the opening angle 416 may be approximately 36° such that the percentage opening of the grille shutters is approximately 40%. In another example, the opening angle may be approximately 9° such that the percentage opening of the grille shutters is approximately 10%. In some cases, the controller may also determine a percentage closing of the grille shutters. For example, the percentage closing of the grille shutters may be 100 minus the percentage opening. In the example of the percentage opening being 40%, the percentage closing is 60%. The partially open grille shutter vane 114 allows ambient airflow 116 to flow around the vane, through the opening created by the partially open grille shutter vane 114, and into the vehicle and toward the engine. The resulting pressure from the force 414 acting on the grille shutter vane 114 may decrease as the percentage opening and opening angle 416 increases.

A third grille shutter position is shown at 406. The third grille shutter position is a fully open position, thereby allowing maximal ambient airflow 116 to enter the vehicle and engine compartment through the grille. Thus, the fully open position may be referred to herein as a maximal opening or maximal percentage opening. When the grille shutters are fully open, the opening angle is approximately 90° and the percentage opening is 100%. The force 414 on the outer face of the grille shutter vane 114 may have little effect on the resulting grille shutter position since the vanes are fully open. Further, upon reaching the maximal percentage opening of 100% (and an opening angle of 90°), the grille shutter vane 114 may contact an end stop 420. The end stop 420 may be coupled to a support structure (e.g., an outer frame) of the grille shutter system 110. For example, the end stop 420 may be positioned along a lateral axis of at least one grille shutter vane 114 of a group of grille shutters. As such, at least one grille shutter vane 114 of the group of grille shutters may contact the end stop 420 upon reaching the maximal percentage opening of 100%. In response to the grille shutter vane 114 contacting the end stop, the controller may detect a stall current. Thus, detecting the stall current may verify the grille shutters are at the maximal percentage opening.

In this way, grille shutter vanes 114 of a grille shutter system 110 may be adjusted into a plurality of positions between 0% open (fully closed position) and 100% open (maximal percentage opening or fully open position). A motor may actuate the grille shutters into different positions based on a commanded grille shutter position.

The system of FIGS. 1-4 provides for a system comprising grille shutters positioned at a vehicle front end, a motor coupled to the grille shutters and operable to adjust a position of the grille shutters, an end stop positioned along a lateral axis of at least one vane of the grille shutters and activatable by the grille shutters upon reaching a maximal opening to produce a stall current, and a controller with computer readable instructions for upon reaching the maximal opening, adjusting the grille shutters to a secondary opening and then back to the maximal opening, the secondary opening smaller than the maximal opening. The computer readable instructions further include instructions for recalibrating the grille shutters when the stall current is not detected after adjusting the grille shutters back to the maximal opening from the secondary opening.

Grille shutters of a grille shutter system (such as grille shutter system 110 shown in FIGS. 1-3) may be adjusted based on various engine operating conditions. For example, a desired grille shutter position, or percentage opening of the grille shutters, may be based on one or more of engine coolant temperature (ECT), additional engine temperatures, a driving condition (e.g., such as acceleration or deceleration), pedal position, vehicle speed, and/or CAC efficiency (or other conditions of the CAC such as CAC temperature). For example, an engine controller (such as controller 12 shown in FIG. 1) may increase the opening of the grille shutters responsive to one or more of an increase in ECT, and increase in the additional engine temperatures, a non-driven vehicle condition (e.g., such as deceleration), and a decrease in CAC efficiency indicating a need for additional cooling of the charge air. Likewise, the engine controller may decrease the opening of the grille shutters responsive to one or more of vehicle driving conditions (e.g., acceleration), increased CAC efficiency (or a decrease in CAC temperature below a dew point temperature), a decrease in ECT, or a decrease in additional engine temperatures. A grille shutter control algorithm may determine a desired position of the grille shutters based on one or more of the above engine operating conditions. For example, the algorithm may consider all or a portion of the above engine operating conditions (e.g., temperatures, driving conditions, CAC efficiency, etc.) to determine the desired grille shutter position that may provide necessary cooling to engine components while also increasing fuel economy.

In some examples, the controller may adjust the grille shutters only based on ECT. For example, when ECT increases above a threshold temperature, the controller may determine the desired position of the grille shutters based on ECT and not based on the additional engine operation conditions (e.g., CAC efficiency, additional engine temperature, vehicle driving conditions, pedal position, etc.). For example, during ECT above the threshold temperature, the desired percentage opening of the grille shutters may be a function of ECT. Specifically, as ECT increases further above the threshold temperature, the percentage opening (e.g., amount of opening) may increase until the grille shutters are opened to the maximal percentage opening (100%). In this way, adequate cooling may be provided to the engine. Once the ECT decreases back below the threshold temperature the controller may resume adjusting the grille shutters based on ECT and the additional engine operating conditions.

Additionally, when ECT is above the threshold temperature, the controller may adjust the grille shutters between a base (e.g., minimum) percentage opening and maximal percentage opening (e.g., 100% open). The base percentage opening (or base opening) may be a percentage opening greater than 0% (e.g., fully closed) that may provide enough base airflow to the engine to reduce the likelihood of the vehicle cooling system entering a smart of failsafe cooling mode wherein increased energy is used to cool the engine and vehicle components. In one example, the base percentage opening may be approximately 10%. In another example, the base opening may be a value smaller or larger than 10%. Thus, when the ECT increases above the threshold temperature, the controller may adjust the grille shutters to 10% open. The controller may then increase the opening of the grille shutters from the base opening as ECT increases further above the threshold temperature.

After determining the desired grille shutter position, the controller may adjust the motor of the grille shutter system based on a commanded grille shutters position. In some examples, the commanded grille shutter position may be different than the desired grille shutter position to account for grille shutter gear lash, vehicle speed, etc. For example, commanding the grille shutters to a first position may actually result in a second, different grille shutter position which may be the same or similar to the desired grille shutter position. In other examples, the desired grille shutter position may be the same as the commanded grille shutter position.

As discussed above with reference to FIG. 4, the grille shutter system may include an end stop. When the grille shutters hit the end stop and are 100% open, the controller may detect a stall current. As a result, actuation of the end stop may indicate the grille shutters are at the maximal percentage opening. In some cases, the controller may command the grille shutters to the maximal percentage opening of 100%. However, the grille shutters may not activate the end stop upon first being commanded to 100% open due to gear lash and/or additional mechanical deficiencies within the grille shutter system.

In some embodiments, the position of the grille shutters may be verified with a method of backing the shutters off to a calibratable position after commanding the grille shutters to the maximal percentage opening. Specifically, after adjusting the grille shutters to the maximal percentage opening, the controller may adjust the grille shutters to a secondary percentage opening. The secondary percentage opening may be a percentage opening smaller than the maximal percentage opening. Further the secondary percentage opening may be a percentage opening achievable by adjusting the grille shutter system motor by at least one motor increment (e.g., position). After backing the grille shutters off to the secondary percentage opening (or secondary position), the controller may adjust the grille shutters back to the maximal percentage opening. If the stall current is detected after adjusting the grille shutters back to the maximal percentage opening, no recalibration of the grille shutter position may be required. However, if the stall current is not detected after moving the grille shutters from the secondary position to the maximal percentage opening, the controller may indicate degradation. Then, when the system is able, the controller may initiate recalibration of the grille shutter system, thereby increasing grille shutter position control. For example, after the ECT decreases back below the threshold temperature, the controller may recalibrate the grille shutters if a request for recalibration was indicated during the adjusting the grille shutters based on ECT. In other examples, the position verification process described above may be performed during grille shutter operation when ECT is above or below the threshold and/or during grille shutter operation wherein the maximal percentage opening is commanded due to additional engine operating conditions.

Additionally, the controller may indicate degradation of the grille shutters if a position error of the grille shutters is above a threshold. Position error over the threshold may also result in recalibration of the grille shutter position. The position error may be determined based on a difference between a commanded grille shutter position and a feedback (e.g., actual) grille shutter position as indicated by a position feedback sensor (e.g., position sensor 314 shown in FIG. 3).

As described above, the motor (e.g., motor 202 shown in FIGS. 2-3) of the grille shutter system may be a stepper motor which adjusts the grille shutters incrementally. Upon receiving a commanded grille shutter position (and a corresponding motor position), the motor may begin adjusting and moving the grille shutters toward the commanded position. At the same time, the controller may determine the absolute value of the difference between the commanded position and the actual feedback position of the grille shutters. Determining the difference is less than a previously determined difference may indicate the grille shutters are advancing towards the desired set point (e.g., commanded) position. However, if the determined difference is greater than the previous difference, the controller may determine the position error is increasing and increment an error counter. When the error counter is over a limit (e.g., number of counts is greater than a threshold number of counts), the controller may indicate grille shutter degradation and recalibrate the grille shutters. Further, the controller may only increment the error counter if the difference between the commanded and feedback position (referred to herein as the position error difference) is outside of an error tolerance range. The error tolerance range may be a range of allowable error that may be due to the finite number of motor positions which may not match with the exact commanded grille shutter position. In this way, if the actual grille shutter position is a threshold amount above or below the commanded position (indicating it is within the tolerance range), the controller may not increment the error counter.

Likewise, the controller may decrement the error counter if the absolute value of the commanded position and the feedback position is smaller than the previous difference. An example of incrementing the error counter based on the position error difference is shown at FIG. 5. Specifically, graph 500 shows changes in a commanded grille shutter position at plot 502, changes in a feedback grille shutter position at plot 504, changes in a tolerance range between plots 506 and 508, and changes in counts of a position error counter at plot 510. The tolerance range is shown between plots 506 and 508. As such, plot 506 may be an upper tolerance threshold and plot 508 may be a lower tolerance threshold. A position error tolerance amount may be added to the commanded grille shutter position to get the upper tolerance threshold and subtracted from the commanded grille shutter position (plot 502) to get the lower tolerance threshold. As such, the tolerance range changes with changing commanded grille shutter position; however, the amount (size) of the tolerance range may remain the same based on a set position error tolerance range.

Prior to time t1, the feedback grille shutter position (plot 504) is outside of the tolerance range (plots 506 and 508) and the position error may be increasing, as indicated by the absolute value of the difference between the commanded position and the feedback position being greater than the previous difference. In response, the controller may increment the position error counter. At time t2, the position error difference may begin decreasing such that each subsequent difference is smaller than the previous difference. As a result, the controller decrements the position error counter, even though the position error difference remains outside of the tolerance range.

At time t3, the feedback position (plot 504) decreases outside of the tolerance range. Additionally, the position error difference may be increasing. As a result, the position error counter is incremented. However, as the error decreases, the counter is again decremented. In this way, the controller may increment and decrement the position error counter based on the position error difference during grille shutter operation.

Turning now to FIG. 6, a method 600 is shown for adjusting grille shutters based on engine coolant temperature (ECT). Instructions for executing method 600 may be stored within a memory of a controller (such as controller 12 shown in FIG.

1) and executed by the controller. As such, the controller may determine a desired grille shutter position (e.g., a desired percentage opening) and a commanded grille shutter position based on engine operating conditions. The controller may then actuate a grille shutter motor to adjust the grille shutters into the desired position.

The method begins at 602 by estimating and/or measuring engine operation conditions. Engine operating conditions may include engine speed and load, vehicle speed, pedal position, conditions of the CAC (CAC temperature and pressure), CAC efficiency, engine temperatures, ECT, feedback grille shutter position, etc. At 604, the method includes determining if ECT is greater than a threshold temperature. The threshold temperature may be based on an ECT indicating a need for increased cooling of the radiator and additional engine components. If the ECT is not above the threshold, the method continues on to 606. At 606, the controller may determine the desired and corresponding commanded grille shutter position based on ECT and additional engine operation conditions. The additional engine operating conditions may include one or more of driving conditions, pedal position, CAC efficiency, vehicle speed, etc.

Alternatively at 604, if the ECT is greater than the threshold temperature, the method continues on to 608 where the controller determines the desired and corresponding commanded grille shutter position based on ECT independent of additional engine operation conditions. Specifically, the determined commanded grille shutter position may be a function of ECT only. In another example, the desired grille shutter position may be a function of ECT only and the corresponding commanded grille shutter position may be based on the desired grille shutter position and vehicle speed. Further, the desired and/or commanded grille shutter position may a function of ECT starting from a base percentage opening. The base percentage opening may be a partially open position. In one example, the base percentage opening may be 10%. In another example, the base percentage opening may be greater than 0% and smaller or greater than 10%. In this way, the controller may open the grille shutters to at least the base opening when the ECT is greater than the threshold.

The method continues on from 608 to 610 to determine if a maximal opening is requested. Said another way, the method at 610 includes determining if the desired and/or commanded position is the maximal percentage opening. As discussed above, the maximal percentage opening may be 100% such that the grille shutters are fully opened. If the maximal opening is not requested, the method continues on to 612 to adjust the grille shutters into the commanded position. The method at 606 also continues to the method at 612. Adjusting the grille shutters into the commanded position may include determining a corresponding motor position and actuating the grille shutter motor to adjust the grille shutters into the commanded position. The method at 612 may include increasing or decreasing the opening of the grille shutters. As such, the amount of airflow entering the engine through the grille may increase or decrease, respectively. The motor may adjust the grille shutters into a plurality of positions between 0% open (fully closed) and 100% open (maximal percentage opening).

Continuing on to 614, the method includes determining if a grille shutter position error is greater than a threshold. The method at 614 may occur concurrently with the adjusting the grille shutters at 612. As such, the position error may indicate when the grille shutter vanes are advancing toward the commanded grille shutter position. The position error may be based on a position error difference between the commanded position and the actual position of the grille shutters and a previous position error difference. A method for determining the position error is presented at FIG. 7 and discussed further below. If the position error is greater than a threshold (as described at FIG. 7), the method continues on to 616 to indicate grille shutter degradation and recalibrate the grille shutters. Recalibrating the grille shutters may include running a recalibration routine that calibrates the commanded grille shutter position with the actual feedback grille shutter position. As a result, the grille shutter position error between the commanded and actual grille shutter positions may be reduced. In some examples, the method at 616 may include setting a position degradation indication or flag. Then, when the system is able, the controller may execute the recalibration routine. For example, if ECT is above the threshold temperature, the controller may wait until the ECT decreases below the threshold temperature to execute the grille shutter recalibration routine.

Alternatively at 614, if the position error is not greater than the threshold, the method continues on to 618 to continue grille shutter operation and not recalibrate the grille shutters. The method at 618 may include continuing to adjust the grille shutters based on engine operating conditions.

Returning to 610, if the commanded grille shutter position is the maximal percentage opening (100% open), the method continues on to 620 to adjust the grille shutters to the maximal opening. The method at 620 may include actuating the motor into a desired motor position corresponding to the commanded grille shutter position. As a result, the grille shutters may be adjusted to or close to the commanded grille shutter position. After adjusting the grille shutters to the maximal percentage opening, the method continues on to 622 to adjust the grille shutters to a secondary position (e.g., secondary percentage opening). The secondary position may be a percentage opening smaller than the maximal percentage opening. For example, the secondary position may correspond to a percent opening of 90%. In another example, the secondary position may correspond to a percent opening greater or smaller than 90%, but smaller than 100%. The secondary position may be a calibratable position corresponding to a decrease in at least one motor position (increment) from the maximal percentage opening.

After adjusting the grille shutters into the secondary position, the method continues on to 624 to adjust the grille shutters back to the maximal opening. In one example, the grille shutters may remain at the secondary position for a duration before moving back to the maximal opening. The duration may be based on amount of time for the motor to adjust a direction of motion or for the feedback position to be determined. In another example, the grille shutters may move back to the maximal opening directly after moving to the secondary position.

After adjusting the grille shutters back to the maximal percentage opening, the method continues on to 626 to determine if a stall current is detected, thereby indicating the grille shutters have reached the end stop and are fully open. If the stall current is not detected, the method continues on to 616 to indicate degradation and recalibrate the grille shutters when the system is able. Specifically, if the stall current is not detected, the controller may set an out of position indication or flag. Then, once the ECT decreases below the threshold temperature, the controller may execute the grille shutter recalibration routine. In this way, the grille shutters may continue to be adjusted and provide cooling airflow based on ECT while the ECT is above the threshold. Further, waiting to recalibrate until the ECT decreases below the threshold may reduce constant grille shutter repositioning (at 620-624) and recalibration while ECT is above the threshold.

Alternatively at 626, if the stall current is detected, the grille shutters may be at the maximal percentage opening. Thus, the method continues on to 628 to continue grille shutter operation and not recalibrate the grille shutters. The method at 628 may include continuing to adjust the grille shutters based on ECT while ECT remains above the threshold.

FIG. 7 shows a method 700 for determining a position error of grille shutters. Method 700 may continue on from 614 of method 600, as described above with reference to FIG. 6. As such, instructions for carrying out method 700 may be stored within the memory of the controller. Further, method 700 may be executed by the controller.

Method 700 begins at 702 by continuously receiving grille shutter (GS) position feedback during the adjusting the grille shutters. Specifically, the method at 702 may include receiving a grille shutter position signal from a position sensor positioned proximate to the grille shutter vanes. The position received from the position sensor may be referred to herein as the feedback grille shutter position (e.g., the actual position of the grille shutter vanes). At 704 the method includes determining if the absolute valve of the difference between the commanded grille shutter position and the feedback grille shutter position (referred to herein as the position error difference) is greater than a previous position error difference and the position error difference is outside a tolerance range. The previous position error difference may be a previously determined difference. Further, the tolerance range may be an allowable difference around the commanded grille shutter position. The method at 704 may include calculating the position error difference at a set sampling rate (e.g., calculating the position error difference at set increments of time). In one example, the sampling rate may be based on a rate of adjusting via the motor and/or a sampling rate of the feedback position with the position sensor.

If the position error difference is not greater than the previous difference or the position error difference is not outside of the tolerance range, the method continues to 706 to decrement the error counter. However, if the position error difference is greater than the previous difference and the position error is outside the tolerance range, the method continues on to 708 to increment the error counter. At 710 the method includes determining if the error counter is over a set limit. The set limit may be a threshold number of counts. Thus, the method at 710 may include determining if the counts of the error counter are over the threshold number of counts. If the error counter is not over the limit, the method determines the position error is less than or substantially equal to a threshold error at 712. The method may then return to 618 of method 600 to continue grille shutter operation without recalibrating the grille shutter system.

Alternatively, if the error counter is over the limit at 710, the method continues to 714 to determine the position error is greater than the threshold error. The threshold error may include the position error difference being outside the tolerance range and increasing for a threshold number of counts. The method may then return to 616 of method 600 to indicate grille shutter degradation and recalibrate the grille shutter system when the system is able (e.g., when ECT is below the threshold temperature). The method may additionally include resetting the error counter. Thus, method 700 may result in recalibration of the grille shutter positioning system if the position error is increasing during grille shutter operation.

In this way, an engine method comprises adjusting grille shutters between a base opening and maximal opening as a function of engine coolant temperature (ECT). The method further comprises upon reaching the maximal opening, adjusting the grille shutters to a secondary opening, the secondary opening smaller than the maximal opening, and then back to the maximal opening and recalibrating the grille shutters when a stall current is not detected after adjusting the grille shutters back to the maximal opening.

Adjusting the grille shutters as a function of ECT includes, when ECT is greater than a threshold, adjusting the grille shutters as function of ECT only and not based on additional engine operating conditions, the adjusting including increasing an opening percentage of the grille shutters as ECT increases. The method may further comprise adjusting the grille shutters based on the ECT and the additional engine operating conditions when ECT is less than the threshold, the additional operating conditions including one or more of a vehicle driving condition, pedal position, charge air cooler efficiency, or charge air cooler temperature.

In one example, recalibrating the grille shutters includes recalibrating the grille shutters after the ECT decreases below the threshold responsive to not detecting the stall current during operation at ECT above the threshold. Further, adjusting grille shutters includes actuating a motor coupled to the grille shutters. In one example, the motor is a stepper motor. In one example, the secondary opening is an opening corresponding to a decrease in at least one motor position of the motor from the maximal percentage opening. Additionally, the method may comprise recalibrating the grille shutters when a position error reaches a threshold, the position error based on a position error difference between a commanded position and an actual position of the grille shutters and a previous position error difference, the actual position based on feedback from a position sensor.

FIG. 8 shows examples of adjusting grille shutters based on ECT. Specifically, graph 800 shows changes in grille shutter percentage opening at plot 802, changes in engine coolant temperature at plot 804, and changes in pedal position at plot 806. The pedal position (PP) may be one of the additional engine operating conditions which grille shutter position is based on when ECT is below the threshold temperature. In alternate embodiments, additional or alternative engine operating conditions, such as CAC efficiency, may be used to determine grille shutter position.

Prior to time t1, the ECT is below the threshold temperature, T1. The grille shutter percentage opening may be 0% such that the grille shutters are fully closed responsive to pedal position and/or additional engine operating conditions. At time t1, ECT increases above the threshold temperature T1. In response, the desired and commanded grille shutter position are determined based on ECT alone and not based on pedal position or any additional engine operating condition. The controller first adjusts the grille shutters to the base percentage opening, Base %, at time t1. The percentage opening of the grille shutters then increases as ECT increases after time t1. At time t2, the grille shutters are commanded to 100% open (e.g., the maximal percentage opening). In response, the controller decreases the grille shutter opening to the secondary percentage opening, SP %, and then back to 100% open. If the controller detects the stall current produced by the grille shutters contacting the end stop, the controller does not recalibrate the grille shutters when the ECT falls back below the threshold temperature T1. However, if the controller does not detect the stall current, the controller may recalibrate the grille shutter position after time t3, when the ECT decreases below the threshold temperature T1. Further, at time t1, when the ECT decreases below the threshold temperature T1, the controller resumes adjusting the grille shutter opening based on ECT and additional engine operating conditions such as pedal position.

As shown before time t1 and after time t3 in FIG. 8, during a first condition, a method may include adjusting grille shutters based on engine coolant temperature (ECT) and additional engine operating conditions. In one example, the additional engine operating conditions includes pedal position. In another example, the additional engine operating conditions include one or more of a vehicle driving condition, pedal position, charge air cooler efficiency, charge air cooler temperature, or vehicle speed. The first condition includes when ECT is less than the threshold temperature. Further, adjusting the grille shutters during the first condition may include adjusting the grille shutters into a position between fully closed (0% open) and fully open (100% open).

As shown between time t1 and time t3, during a second condition when ECT is greater than a threshold temperature, the method may include adjusting the grille shutters from a partially open position based on ECT independent of the additional engine operating conditions. As shown in FIG. 8, the partially open position is the base percentage opening, Base %. Adjusting the grille shutters based on ECT during the second condition includes determining a percentage opening of the grille shutters as a function of only ECT, the percentage of opening being between the partially open position and a maximal percentage opening (e.g., 100% open as shown in FIG. 8), the percentage opening increasing with increasing ECT. In one example, the partially open position is a percentage opening of 10% and the maximal percentage opening is a percentage opening of 100%.

The method may further include, during the second condition and after adjusting the grille shutters to a maximal percentage opening (as shown after time t2 in FIG. 8), adjusting the grille shutters to a secondary percentage opening (SP %) and then back to the maximal percentage opening, the secondary percentage opening smaller than the maximal percentage opening. The method may further include indicating degradation and setting an out of position flag when a stall current is not detected upon adjusting the grille shutters back to the maximal percentage opening from the secondary percentage opening. The method may then include recalibrating the grille shutters responsive to the ECT decreasing below the threshold temperature when the out of position flag is set.

The method may further include, during the first condition, not adjusting the grille shutters to the secondary percentage opening after reaching the maximal percentage opening. Further, adjusting the grille shutters under both the first and the second condition may include determining a commanded position of the grille shutters and adjusting a motor coupled to the grille shutters to move the grille shutters to the commanded position. The method further includes recalibrating the grille shutters when a position error reaches a threshold, the position error based on a difference between the commanded position and a feedback position, the feedback position based on output from a grille shutter position sensor.

In this way, vehicle grille shutters may be adjusted based on ECT in order to provide cooling airflow to the engine. When ECT is below a threshold, the controller may adjust the grille shutters based on ECT and additional engine operating conditions. However, when ECT is above the threshold, the controller may adjust the grille shutters based on ECT only. As a result, a technical effect of the invention is achieved by adjusting the grille shutters based on ECT, thereby providing adequate cooling to the engine and increasing engine performance. Further, another technical effect of the invention is achieved by verifying a position of the grille shutters and/or determining a position error of the grille shutters. If grille shutter degradation is indicated based on the position error or an absence of a stall current upon adjusting the grille shutters from a maximal to a secondary and back to the maximal percentage opening, the controller may initiate a grille shutter recalibration routine. As a result, grille shutter position control may be increases, thereby providing the necessary engine cooling while also increasing fuel economy.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
via an electronic controller of an engine:
during a first condition, adjusting grille shutters based on engine coolant temperature (ECT) and additional engine operating conditions and recalibrating the grille shutters responsive to a position error reaching a threshold error, the position error determined based on a difference between a commanded position and a feedback position of the grille shutters;
during a second condition when ECT is greater than a threshold temperature, adjusting the grille shutters from a partially open position based on ECT independent of the additional engine operating conditions and in response to the position error reaching the threshold error while the ECT is greater than the threshold temperature, waiting to recalibrate the grille shutters until after the ECT decreases below the threshold temperature; and during the second condition and after adjusting the grille shutters to a maximal percentage opening, responsive to reaching the maximal percentage opening and not based on ECT, adjusting the grille shutters to a secondary percentage opening and then back to the maximal percentage opening, the secondary percentage opening smaller than the maximal percentage opening.

2. The method of claim 1, wherein adjusting the grille shutters based on ECT during the second condition includes determining a percentage opening of the grille shutters as a function of only ECT, the percentage opening being between the partially open position and a maximal percentage opening, the percentage opening increasing with increasing ECT.

3. The method of claim 2, wherein the partially open position is a percentage opening of 10% and the maximal percentage opening is a percentage opening of 100%.

4. The method of claim 1, further comprising indicating degradation and setting an out of position flag when a stall current is not detected upon adjusting the grille shutters back to the maximal percentage opening from the secondary percentage opening, where an end stop attached to a support structure of the grille shutters is configured to output the stall current when the grille shutters contact the end stop, and where the electronic controller is configured to detect the output stall current.

5. The method of claim 4, further comprising recalibrating the grille shutters responsive to the ECT decreasing below the threshold temperature when the out of position flag is set.

6. The method of claim 1, further comprising during the first condition, not adjusting the grille shutters to the secondary percentage opening after reaching the maximal percentage opening and wherein the second percentage opening is a calibratable percentage opening achievable by adjusting a motor coupled to the grille shutters by at least one motor increment.

7. The method of claim 1, wherein adjusting the grille shutters includes determining the commanded position of the grille shutters and actuating via the electronic controller a motor coupled to the grille shutters to move the grille shutters to the commanded position.

8. The method of claim 7, wherein the feedback position is based on output from a grille shutter position sensor and wherein recalibrating the grille shutters includes running a recalibration routine that calibrates the commanded position with the feedback position and reduces the position error.

9. The method of claim 1, wherein the first condition includes when ECT is less than the threshold temperature and wherein adjusting the grille shutters during the first condition includes adjusting the grille shutters into a position between fully closed and fully open.

10. The method of claim 1, wherein the additional engine operating conditions include one or more of a vehicle driving condition, pedal position, charge air cooler efficiency, charge air cooler temperature, or vehicle speed and wherein the position error over the threshold error includes the difference between the commanded position and the feedback position of the grille shutters being outside a tolerance range including an upper tolerance threshold and a lower tolerance threshold and increasing for a threshold number of counts of an error counter.

11. An engine method, comprising:
via a controller:
adjusting grille shutters (GS) between a base opening and maximal opening as a function of engine coolant temperature (ECT);
in response to adjusting the GS to the maximal opening, adjusting the GS to a secondary opening smaller than the maximal opening, and then back to the maximal opening, based on reaching the maximal opening and not based on the ECT; and
recalibrating the GS when a stall current is not detected at the controller after adjusting the GS back to the maximal opening; and
wherein adjusting the GS as a function of ECT includes, when ECT is greater than a threshold, adjusting the GS as a function of ECT only and not based on additional engine operating conditions, the adjusting including increasing an opening percentage of the GS as ECT increases and wherein the adjusting the GS to the secondary opening and then back to the maximal opening occurs while ECT remains above the threshold and is in response to reaching the maximal opening alone and not based on ECT, and further comprising indicating GS degradation when the stall current is not detected, where the stall current is a signal produced by an end stop attached to the GS when the GS are at the maximal opening.

12. The method of claim 11, further comprising adjusting the GS based on the ECT and the additional engine operating conditions when ECT is less than the threshold, the additional engine operating conditions including one or more of a vehicle driving condition, pedal position, charge air cooler efficiency, or charge air cooler temperature.

13. The method of claim 11, wherein the recalibrating the GS includes recalibrating the GS after the ECT decreases below the threshold responsive to a position degradation flag set at the controller in response to not detecting the stall current during operation at ECT above the threshold and wherein recalibrating the GS includes running a recalibration routine via the controller that calibrates a commanded GS position with an actual feedback GS position and reduces a GS position error between the commanded GS position and actual feedback GS position.

14. The method of claim 11, wherein adjusting GS includes actuating a motor coupled to the GS via the controller and wherein the motor is a stepper motor.

15. The method of claim 14, wherein the secondary opening is an opening corresponding to a decrease in at least one motor position of the motor from the maximal opening and wherein adjusting the GS to the secondary opening and then back to the maximal opening includes remaining at the secondary opening for a duration before moving back to the maximal opening, where the duration is based on an amount of time for the motor to adjust a direction of motion or for a feedback position of the GS to be determined.

16. The method of claim 11, further comprising recalibrating the GS when a position error reaches a threshold error, the position error based on a position error difference between a commanded position and an actual position of the GS and a previous position error difference, the actual position based on feedback from a position sensor of the GS, where the position sensor is in communication with the controller, and where the threshold error includes the position error difference being outside a tolerance range including an upper and lower tolerance threshold and increasing for a threshold number of counts of an error counter.

17. An engine system, comprising:
grille shutters positioned at a vehicle front end;
a motor coupled to the grille shutters and operable to adjust a position of the grille shutters;
an end stop attached to a support structure of the grille shutters, positioned along a lateral axis of at least one vane of the grille shutters, and activatable by the grille shutters upon reaching a maximal opening to produce a stall current; and a controller in communication with the end stop and configured to detect the stall current, the controller having computer readable instructions for:

in response to reaching the maximal opening, adjusting the grille shutters to a secondary opening and then back to the maximal opening directly after moving to the secondary opening based on reaching the maximal opening and not based on additional engine operating conditions, the secondary opening smaller than the maximal opening; and recalibrating the grille shutters when the stall current is not detected by the controller after adjusting the grille shutters back to the maximal opening from the secondary opening, wherein recalibrating the grille shutters includes running a recalibration routine via the controller that calibrates a commanded grille shutter position with an actual feedback grille shutter position and reduces a grille shutter position error between the commanded grille shutter position and actual feedback grille shutter position, and wherein the additional engine operating conditions that the grille shutters are not adjusted based on, in response to reaching the maximal opening, includes engine coolant temperature.

* * * * *